US012578599B2

(12) United States Patent (10) Patent No.: US 12,578,599 B2
Matsunaga et al. (45) Date of Patent: Mar. 17, 2026

(54) REFLECTING DEVICE HAVING LIQUID CRYSTAL MATERIAL

(71) Applicant: Japan Display Inc., Tokyo (JP)

(72) Inventors: Kazuki Matsunaga, Tokyo (JP); Shinichiro Oka, Tokyo (JP); Mitsutaka Okita, Tokyo (JP); Daiichi Suzuki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/885,794

(22) Filed: Sep. 16, 2024

(65) Prior Publication Data

US 2025/0004322 A1 Jan. 2, 2025

Related U.S. Application Data

(63) Continuation of application No. PCT/JP2023/001961, filed on Jan. 23, 2023.

(30) Foreign Application Priority Data

Mar. 29, 2022 (JP) ................................ 2022-054070

(51) Int. Cl.
*G02F 1/1335* (2006.01)
*G02F 1/1343* (2006.01)
*G02F 1/1362* (2006.01)
(52) U.S. Cl.
CPC .. *G02F 1/133553* (2013.01); *G02F 1/134318* (2021.01); *G02F 1/136286* (2013.01)

(58) Field of Classification Search
None
See application file for complete search history.

(56) References Cited

U.S. PATENT DOCUMENTS

| | | | | |
|---|---|---|---|---|
| 2003/0086048 A1* | 5/2003 | Ukita | .................... | G02F 1/1345 349/149 |
| 2010/0220036 A1 | 9/2010 | Maruyama et al. | | |
| 2011/0063199 A1* | 3/2011 | Yamashita | ............ | G02F 1/1345 345/87 |

(Continued)

FOREIGN PATENT DOCUMENTS

| | | |
|---|---|---|
| JP | 2010-226695 A | 10/2010 |
| JP | 2011-019021 A | 1/2011 |

OTHER PUBLICATIONS

International Search Report and Written Opinion mailed on Apr. 4, 2023, received for PCT Application PCT/JP2023/001961, filed on Jan. 23, 2023, 8 pages including English Translation.

*Primary Examiner* — Ryan Crockett
(74) *Attorney, Agent, or Firm* — XSENSUS LLP

(57) ABSTRACT

A reflecting device in an embodiment according to the present invention includes common electrodes arranged in a matrix at a distance in a first direction and a second direction intersecting the first direction, bias electrodes arranged overlapping the common electrodes in a planar view, a liquid crystal layer between the common electrodes and the bias electrodes, and common wirings connecting adjacent common electrodes among the common electrodes. Each of the common wirings has a length of half an effective wavelength $\lambda_g$ when a radio wave of a specific wavelength $\lambda$ propagates through the liquid crystal layer.

10 Claims, 15 Drawing Sheets

(56) References Cited

U.S. PATENT DOCUMENTS

| | | | |
|---|---|---|---|
| 2015/0062691 A1* | 3/2015 | Sayyah | G02F 1/292 |
| | | | 438/479 |
| 2018/0076521 A1* | 3/2018 | Mehdipour | H01Q 5/335 |
| 2022/0037785 A1* | 2/2022 | Okita | H01Q 21/0006 |
| 2022/0253267 A1* | 8/2022 | Kono | G06F 3/0445 |
| 2023/0400747 A1* | 12/2023 | Oka | G02F 1/313 |
| 2024/0027826 A1* | 1/2024 | Okita | H01Q 15/14 |
| 2024/0039156 A1* | 2/2024 | Suzuki | H01Q 15/148 |
| 2024/0128652 A1* | 4/2024 | Okita | H01Q 15/0013 |
| 2025/0015508 A1* | 1/2025 | Suzuki | G02F 1/13 |
| 2025/0023252 A1* | 1/2025 | Matsunaga | H01Q 21/065 |

* cited by examiner

REFLECTING DEVICE HAVING LIQUID CRYSTAL MATERIAL

CROSS-REFERENCE TO RELATED APPLICATIONS

This application is a Continuation of International Patent Application No. PCT/JP2023/001961, filed on Jan. 23, 2023, which claims the benefit of priority to Japanese Patent Application No. 2022-054070, filed on Mar. 29, 2022, the entire contents of each are incorporated herein by reference.

FIELD

An embodiment of the present invention relates to a structure of a radio wave reflecting device using a liquid crystal material that can control the direction of reflection of an incident wave.

BACKGROUND

A reflecting device has the function of reflecting the incident wave in a predetermined direction. It is used, for example, to reflect radio waves in a zone where radio waves are difficult to reach such as between high-rise buildings (blind zone). As a reflecting device of radio waves, for example, a main array element (dipole element) and a sub-array element (power supply element) and a common electrode (ground electrode) are arranged across a dielectric substrate, and the sub-array element is arranged in close proximity to the main array element (refer to Japanese Unexamined Patent Application Publication No. 2011-019021), and a configuration in which the array element and the common electrode (ground electrode) sandwich a dielectric substrate, and the common electrode has a periodic loop shape (refer to Japanese Unexamined Patent Application Publication No. 2010-226695) have been disclosed.

When the part corresponding to the dielectric substrate of the reflecting device is replaced with a liquid crystal layer, the dielectric constant anisotropy of the liquid crystal material can be used, making it possible to vary the directivity of the reflected wave. To change the dielectric constant, it is necessary to apply a voltage to the liquid crystal layer, and for this purpose, a wiring for the bias electrode and a wiring for the common electrode are necessary.

SUMMARY

A reflecting device in an embodiment according to the present invention includes common electrodes arranged in a matrix at a distance in a first direction and a second direction intersecting the first direction, bias electrodes arranged overlapping the common electrodes in a planar view, a liquid crystal layer between the common electrodes and the bias electrodes, and common wirings connecting adjacent common electrodes among the common electrodes. Each of the common wirings has a length of half an effective wavelength $\lambda_g$ with respect to r a radio wave of a specific wavelength $\lambda$ when a radio wave of a specific wavelength $\lambda$ propagates through the liquid crystal layer.

DESCRIPTION OF EMBODIMENTS

Hereinafter, embodiments of the present invention are described with reference to the drawings. However, the present invention can be implemented in many different aspects and should not be construed as being limited to the description of the following embodiments. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements like those described previously with respect to previous drawings may be given the same reference sign (or a number followed by A, B, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

First Embodiment

The reflecting device includes a structure in which a common electrode and a bias electrode are arranged across a liquid crystal layer used as a dielectric layer. The details are described below with reference to the drawings.

1.1 Reflecting Device

Figure 1:
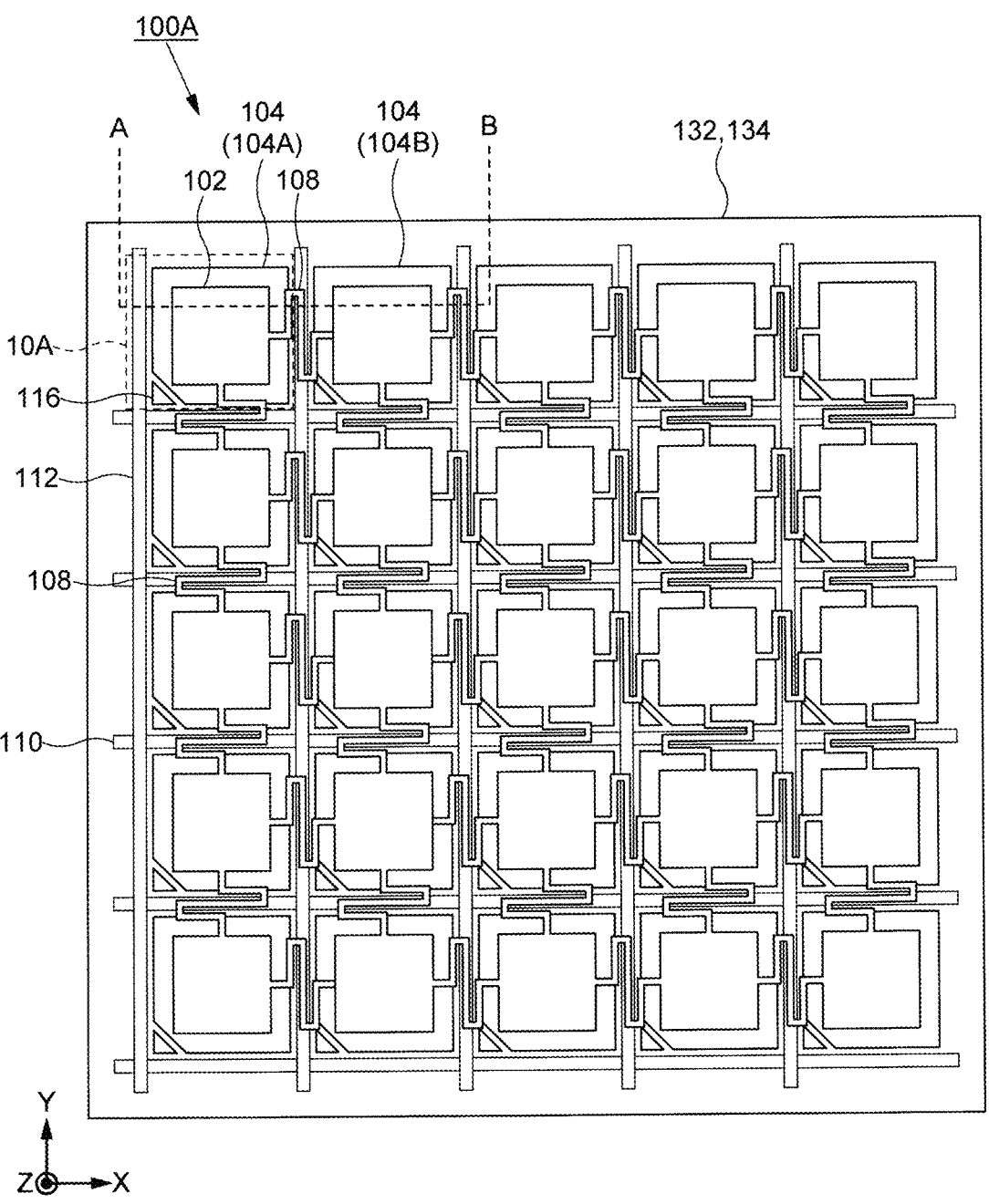
FIG. 1 is a plan view of a reflecting device according to an embodiment of the present invention.
Figure 2:
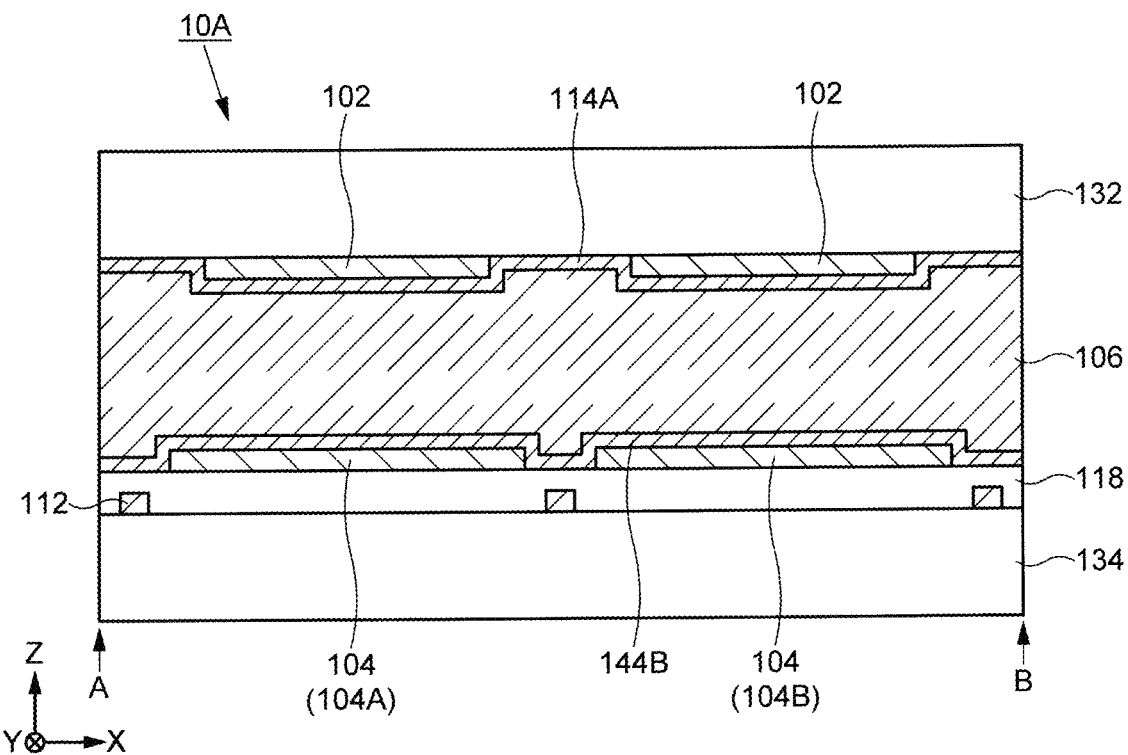
FIG. 2 is a cross-sectional view of the reflecting device shown in FIG. 1 between A and B.

FIG. 1 shows a plan view of the reflecting device 100A according to the first embodiment, and FIG. 2 shows the cross-sectional structure corresponding to the section between A and B shown in FIG. 1. The following description will refer to both FIG. 1 and FIG. 2 as appropriate.

The reflecting device 100A includes at least one common electrode 102, at least one bias electrode 104, and a liquid crystal layer 106 arranged between these electrodes. As shown in FIG. 1, the common electrodes 102 are arranged in an X-axis direction and a Y-axis direction, and the bias electrodes 104 are arranged in a matrix in the X-axis direction and the Y-axis direction, corresponding to common electrodes 102. Therefore, the reflecting device 100A has a configuration in which a plurality of common electrodes 102 and bias electrodes 104 are arranged to form a matrix, respectively. The X-axis direction and the Y-axis direction are used for illustrative purposes and specifically indicate the direction displayed in FIG. 1. The X-axis direction and the Y-axis direction may be read as a first direction and a second direction that intersects the first direction.

The common electrodes 102 are interconnected to each other by the common wiring 108. The plurality of adjacent common electrodes 102 are not necessarily connected to each other by the common wiring 108, and may be connected only along the X-axis direction or only along the Y-axis direction. In contrast, the bias electrodes 104 are arranged so that adjacent electrodes have a gap between them and are physically separated. The common electrode 102 is arranged on a first substrate 132 and the bias electrode 104 is arranged on a second substrate 134. The reflecting device 100A is a device that reflects radio waves incident on the incident surface in a predetermined direction, and the first substrate 132 is arranged on the incident surface side and the second substrate 134 is arranged behind the incident surface. In other words, the common electrode 102 is arranged on the incident surface, and the bias electrode 104 is arranged across the liquid crystal layer 106 behind the common electrode 102.

The reflecting device 100A has a structure in which the common electrode 102, the liquid crystal layer 106, and the bias electrode 104 are arranged overlapping each other in a plan view. The reflecting device 100A is arranged so that a surface on which the common electrode 102 is arranged on the first substrate 132 and a surface on which the bias electrode 104 is arranged on the second substrate 134 are arranged counter to each other, and the liquid crystal layer 106 is arranged between the two surfaces. The reflecting device 100A has a basic unit of a stacked structure of a set of the common electrode 102, the liquid crystal layer 106, and the bias electrode 104 (which may also include the first substrate 132 and the second substrate 134). In the following description, this basic unit is referred to as the unit cell 10A.

The second substrate 134 is arranged with a selection signal line 110 extending in the X direction, a bias signal line 112 extending in the Y direction, and a switching element 116. The switching element 116 is arranged in one-to-one correspondence with the bias electrode 104. A switching operation (on/off state) of the switching element 116 is controlled by the selection signal of the selection signal line 110, and the bias signal (bias voltage) is input from the bias signal line 112. The bias electrodes 104 are individually input with bias signals by the switching element 116. That is, the bias electrodes 104, which are arranged in a matrix, are individually input with bias signals by the switching element 116.

A first alignment film 114A is arranged on the first substrate 132, and a second alignment film 114B is arranged on the second substrate 134. The first alignment film 114A is arranged to cover the common electrode 102, and the second alignment film 114B is arranged to cover the bias electrode 104. The first alignment film 114A and the second alignment film 114B are arranged to control the alignment state of the liquid crystal layer 106. The liquid crystal layer 106 includes elongated rod-shaped liquid crystal molecules. The initial alignment state (alignment state in the absence of an electric field) of the liquid crystal molecules are controlled by the first alignment film 114A and the second alignment film 114B.

The first alignment film 114A and the second alignment film 114B can be of any configuration as long as they have the function of aligning liquid crystal molecules, and can be made of any organic or inorganic material, for example, polyimide. The alignment direction can be horizontal, vertical, or a tilt alignment, but this example shows the case of a horizontally aligned film.

The alignment state of the liquid crystal molecules in the liquid crystal layer 106 is controlled by the bias electrode 104. Since the bias voltage applied to the bias electrode 104 can be controlled for each unit cell 10A, it is possible to control the alignment state of the liquid crystal molecules of the liquid crystal layer 106 for each unit cell 10 A. The dielectric constant of the liquid crystal layer 106 changes with the alignment state of the liquid crystal molecules. The reflected wave of the reflecting device 100A changes its phase according to the dielectric constant of the liquid crystal layer 106. Therefore, it is possible to generate phase differences in the plane of the reflecting device 100A and control the direction of the reflected wave by changing the dielectric constant of the liquid crystal layer 106 in each unit cell 10A.

Since the reflecting device 100 A reflects incident waves incident on the surface where the common electrode 102 is arranged, the common electrode 102 is also called a reflector. The unit cell 10A can also be regarded as a patch antenna with patch electrodes (common electrodes 102) on the top surface of the dielectric (liquid crystal layer 106) and reflective electrodes (bias electrodes 104) on the back surface.

Although not illustrated in FIG. 1 and FIG. 2, the second substrate 134 may be arranged with a driver circuit that outputs a selection signal to the selection signal line 110 and a bias signal to the bias signal line 112. Input terminals may be arranged to input signals and drive power to drive these driver circuits.

1-2. Unit Cell

Figure 3:
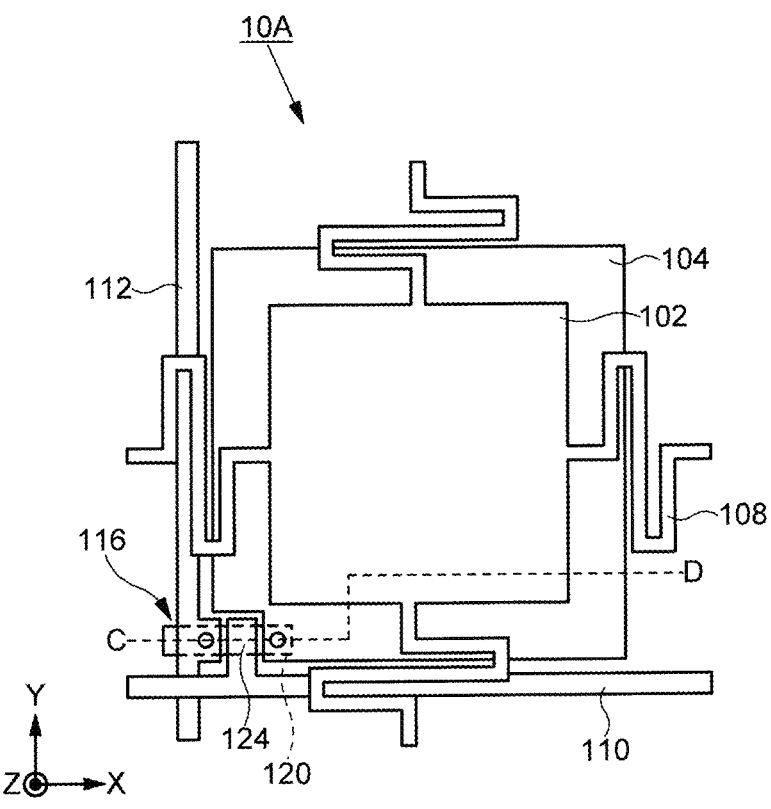
FIG. 3 is a plan view of a unit cell configuring a reflecting device according to an embodiment of the present invention.
Figure 4:
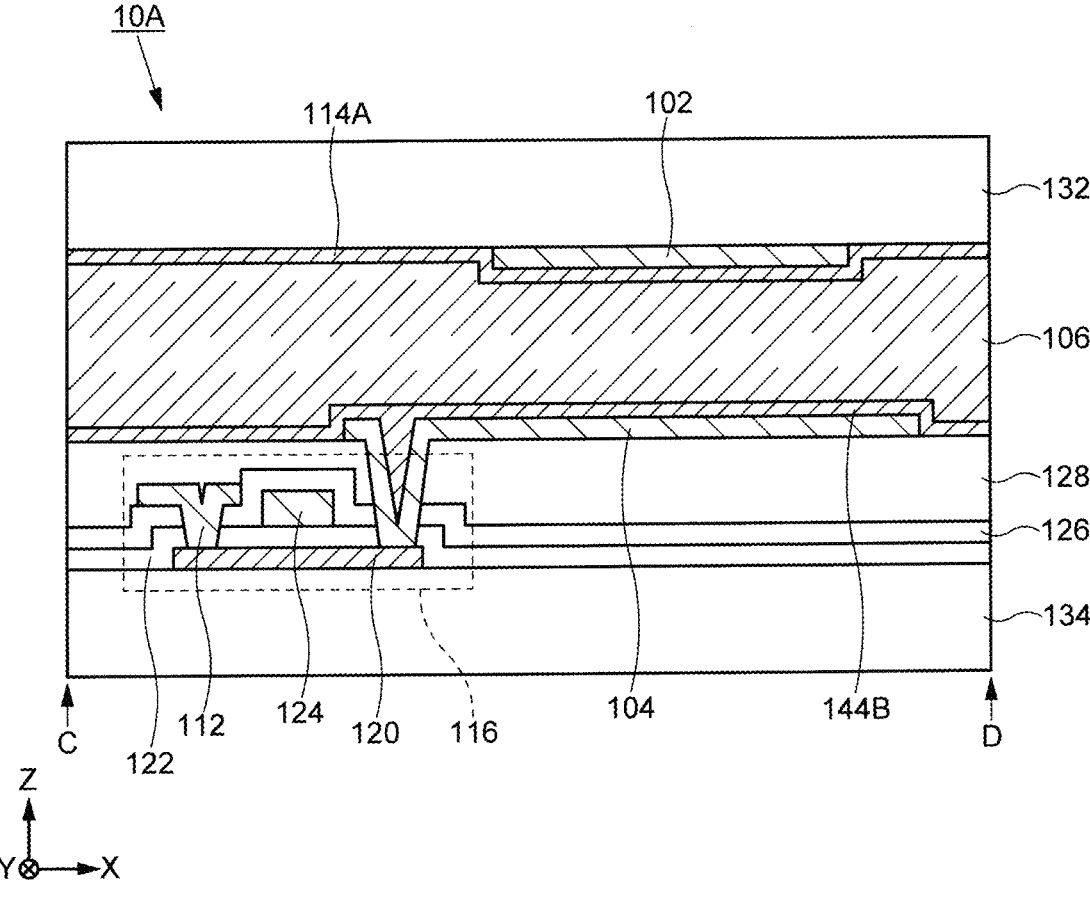
FIG. 4 is a cross-sectional view of the unit cell shown in FIG. 3 between C and D.

FIG. 3 and FIG. 4 show details of the unit cell 10A configuring the reflecting device 100A. FIG. 3 shows a plan view of the unit cell 10A, and FIG. 4 shows a cross-sectional structure of a section between C and D shown in FIG. 3. As shown in FIG. 3 and FIG. 4, the unit cell 10A is arranged so that the common electrode 102, the liquid crystal layer 106, and the bias electrode 104 overlap in a plan view.

The common electrode 102 used in this embodiment has a symmetrical shape with respect to the vertical and horizontal polarization of the incoming radio wave. FIG. 3 shows an example where the common electrode 102 is square. The size (vertical and horizontal dimensions) of the common electrode 102 is set appropriately according to the frequency of the target radio wave. The shape of the common electrode 102 is not limited to a square, but may be rectangular or have other geometric shapes.

The common electrode 102 is connected to the common wiring 108. The common wiring 108 has a predetermined length and width. One end of the common wiring 108 is connected to a center point of one side of the common electrode 102. In other words, the common wiring 108 is connected so that the center point of one side of the common electrode 102 is included in the wiring portion of the common wiring 108. There is no limitation in the connection structure of the common wiring 108 and the common electrode 102, for example, the common wiring 108 and the common electrode 102 are formed of the same conductive layer. The common wiring 108 is connected to a power circuit (not shown). The common wiring 108 is grounded or connected to grounded wiring. As shown in FIG. 1, the common wiring 108 connects adjacent common electrodes 102 to each other. When the common electrodes 102 are interconnected by the common wiring 108, the common electrodes 102 arranged in a matrix have equal potential.

The bias electrode 104 is formed in a large area to function as a reflector. As shown in FIG. 3, the bias electrode 104 has a larger area than the common electrode 102 in the unit cell 10A. The bias electrode 104 and the common electrode 102 overlap, and the common electrode 102 is arranged in a region inside the bias electrode 104.

The bias electrode 104 is connected to the bias signal line 112 via the switching element 116. FIG. 3 and FIG. 4 show an example in which the switching element 116 is formed by a transistor. The transistor has a structure in which a semiconductor layer 120, a gate insulating layer 122, and a gate electrode 124 are stacked. An interlayer insulating layer 126 is arranged above the gate electrode 124, and the bias signal line 112 is arranged thereon. The switching element 116 and the bias signal line 112 are filled with a planarization layer 128. The bias electrode 104 is arranged above the planarization layer 128. The bias electrode 104 is connected to an input/output terminal (drain) of the switching element (transistor) 116 through a contact hole. The gate electrode 124 of the switching element (transistor) 116 is connected to the selection signal line 110, and the input/output terminal (source) which is not connected to the bias electrode 104 is connected to the bias signal line 112.

The alignment state of the liquid crystal molecules in the liquid crystal layer 106 is controlled by the bias electrode 104. That is, the liquid crystal molecules in the liquid crystal layer 106 are aligned by the bias signal applied to the bias electrode 104. The bias signal is a DC voltage signal or a polarity-reversal DC voltage signal in which a positive DC voltage and negative DC voltage are alternately reversed.

The liquid crystal layer 106 is formed of a liquid crystal material having dielectric constant anisotropy. For example, the liquid crystal material forming the liquid crystal layer 106 may exhibit liquid crystalline properties and have dielectric constant anisotropy, and nematic liquid crystals are particularly preferred. Whether the dielectric constant anisotropy of the liquid crystal material is positive or negative does not change the effect in this example. Hereafter, the liquid crystal layer 106 with positive dielectric constant anisotropy will be used in this example.

The dielectric constant of the liquid crystal layer 106 changes depending on the alignment state of the liquid crystal molecules. The alignment state of the liquid crystal molecules is controlled by the bias electrode 104. When the incident wave is reflected in the unit cell 10A, a phase of the reflected wave changes according to the dielectric constant of the liquid crystal layer.

The frequency bands to which the reflecting device 100A is applicable are the very short wave (VHF) band, ultra short wave (UHF) band, microwave (SHF) band, submillimeter wave (THF), millimeter wave (EHF) band, and terahertz wave band. The alignment of the liquid crystal molecules in the liquid crystal layer 106 changes with the bias voltage applied to the bias electrode 104, but it hardly follows the frequency of the radio waves incident on the common electrode 102. These characteristics of the liquid crystal molecules allow the bias electrode 104 to change the dielectric constant of the liquid crystal layer 106 while reflecting radio waves at the common electrode 102 and controlling the phase of the reflected radio waves.

The first substrate 132 and the second substrate 134 are arranged to sandwich the liquid crystal layer 106 and to form wiring and are formed of a material having planar properties such as glass, resin, or a metal plate. Transparency is not required. Each layer on the first substrate 132 and the second substrate 134 is formed using the following materials. The semiconductor layer 120 is arranged to form the switching element 116 and is formed of silicon semiconductors such as amorphous silicon and polycrystalline silicon, and oxide semiconductors including metal oxides such as indium oxide, zinc oxide, and gallium oxide. The gate insulating layer 122 and interlayer insulating layer 126 are arranged to insulate each wiring layer and are preferably made of an insulating material, such as a silicon oxide film, or silicon nitride film, or a laminated structure thereof. The selection signal line 110 and gate electrode 124 are arranged to transmit electrical signals, and a conductive material is preferred, such as a metal film. For example, they are formed of molybdenum (Mo), tungsten (W), or alloys thereof. The bias signal line 112 is arranged to transmit electrical signals, and a conductive material is preferred, such as a metallic film. For example, it is configured with a titanium (Ti)/aluminum (Al)/titanium (Ti) laminate structure or a molybdenum (Mo)/aluminum (Al)/molybdenum (Mo) laminate structure. The planarization layer 128 is arranged to planarize unevenness, such as that formed by switching devices. Any material that has planar properties and insulating properties can be used, for example, organic materials are desirable, and acrylic resins, epoxy resins, polyimide materials, etc. can be used. The common electrode 102, the bias electrode 104, and the common wiring 108 have the function of conducting signals to drive the liquid crystal and reflecting input radio waves. Both of these functions need only be conductive, and metallic films or other materials can be used. Especially, a material with low conductivity is desirable, for example, aluminum, copper, gold, or alloys made from them can be used. Furthermore, in order to lower resistance, the film thickness is preferably thicker than that of bias signal lines and selective signal lines.

Although not shown in FIG. 4, the first substrate 132 and the second substrate 134 are arranged with a gap between them and are attached together by a sealant. The seal material preferably has the function of bonding the first substrate 132 and the second substrate 134 and is formed by an organic material such as acrylic resin or epoxy resin, for example. The liquid crystal layer 106 is sealed within the region enclosed by the first substrate 132, the second substrate 134, and the seal material. The gap between the first substrate 132 and the second substrate 134 is roughly 20 µm to 100 µm, for example, 40 µm. Although not shown, spacers may be arranged between the first substrate 132 and the second substrate 134 to keep the spacing constant.

As shown in FIG. 3, it is possible to change the dielectric constant of the liquid crystal layer 106 for each unit cell 10A, by arranging the common electrodes 102 in a matrix interconnected by the common wiring 108 and the bias electrodes 104 are connected to the bias signal line 112 via the switching element 116 to enable individual control of potential. Thereby, the phase of the reflected wave can be controlled for each unit cell 10A.

1-3. Common Electrode and Common Wiring

FIG. 5A, FIG. 5B, FIG. 5C, and FIG. 5D are enlarged plan views of a portion of a reflecting device according to the present embodiment, and show a plurality of common electrodes 102 and a plurality of common wirings 108. The common wiring 108 shown in FIG. 5A, FIG. 5B, FIG. 5C, and FIG. 5D each have a different shape. The common electrode 102A has a length Px in the direction along the x-axis and a length Py in the direction along the y-axis. The length Px and the length Py are set appropriately according to the frequency of the target radio wave. In the following description, FIG. 5A will be referred to.

The common electrode 102A has a gap Wx with the adjacent common electrode 102B in the direction along the X axis and a gap Wy with the adjacent common electrode 102C in the direction along the Y axis. The gap Wx and the gap Wy is preferably smaller than the length Px and the length Py described above. This is because a more favorable reflection characteristic can be obtained when a plurality of common electrodes 102 are arranged in a reflecting device at a higher density.

The common wiring 108A connecting the common electrode 102A and the adjacent common electrode 102B in the direction along the X axis has a length Lx. In other words, Lx is the distance over which current flows from the connection point of the common electrode 102A and the common wiring 108A to the connection point of the common electrode 102B and the common wiring 108A. The common wiring 108B connecting the common electrode 102A and the adjacent common electrode 102C in the direction along the y-axis has a length Ly. In other words, Ly is the distance from the connection point of the common electrode 102A and the common wiring 108B to the connection point of the common electrode 102C and the common wiring 108B, where the current flows. The length Lx and the length Ly have a length of half the effective wavelength of the target radio wave propagating through the dielectric layer.

Then, where $\lambda$ is the wavelength at which the target radio wave propagates in air, the effective wavelength $\lambda_g$ at which the target radio wave propagates through the dielectric layer can be expressed as in the following equation (1), based on the relative permittivity $\varepsilon_s$ of the dielectric layer.

$$\lambda_g = \lambda/(\varepsilon_s)^{1/2} \tag{1}$$

In other words, the Length Lx and the Length Ly have a length of $\lambda_g/2$.

The length Lx and the length Ly are preferably within ±10% of $\lambda_g/2$. This is because the liquid crystal layer has dielectric constant anisotropy and the effective wavelength $\lambda_g$ changes with the application of a bias voltage. The dielectric constant of the liquid crystal layer varies from a short-axis direction dielectric constant $\varepsilon_\perp$ to a long-axis direction dielectric constant $\varepsilon_\parallel$ ($\varepsilon_\perp < \varepsilon_\parallel$) of the liquid crystal molecules when it has positive dielectric anisotropy. Therefore, the length Lx and the length Ly are preferably included in the range of $\lambda_g/(\varepsilon_\perp)^{1/2}$ to $\lambda_g/(\varepsilon_\parallel)^{1/2}$. Even more desirable is to use the average value $\varepsilon$ of the short-axis direction dielectric constant $\varepsilon_\perp$ and the long-axis direction dielectric constant $\varepsilon_\parallel$, which is $\lambda_g/(\varepsilon)^{1/2}$. For example, liquid crystal molecules have been developed having a short-axis direction dielectric constant $\varepsilon_\perp$ of 2.46 and a long-axis direction dielectric constant $\varepsilon_\parallel$ of 3.53 with dielectric constant anisotropy (Fritzsch, C., Snow, B., Sargent, J., Klass, D., Kaur, S. and Parri, O. (2019), 77-1: Invited Paper: Liquid Crystals beyond Displays: Smart Antennas and Digital Optics. SID Symposium Digest of Technical Papers, 50:1098-1101). Using the average dielectric constant $\varepsilon$, $\varepsilon_\perp$ and $\varepsilon_\parallel$ can be written as $0.8 \times \varepsilon$ and $1.2 \times \varepsilon$, respectively. When the dielectric constant of the liquid crystal layer is varied from $0.8 \times \varepsilon$ to $1.2 \times \varepsilon$, the effective wavelength varies from approximately $0.9 \times \lambda_g$ to $1.1 \times \lambda_g$. Therefore, the length Lx and the length Ly would be desirable to have design values within the range of $0.9 \times \lambda_g/2$ to $1.1 \times \lambda_g/2$. The length Lx and the length Ly are values determined by the wavelength of the scattered and reflected radio waves and are larger than the spacing between the gap Wx and the gap Wy.

Figure 5A:
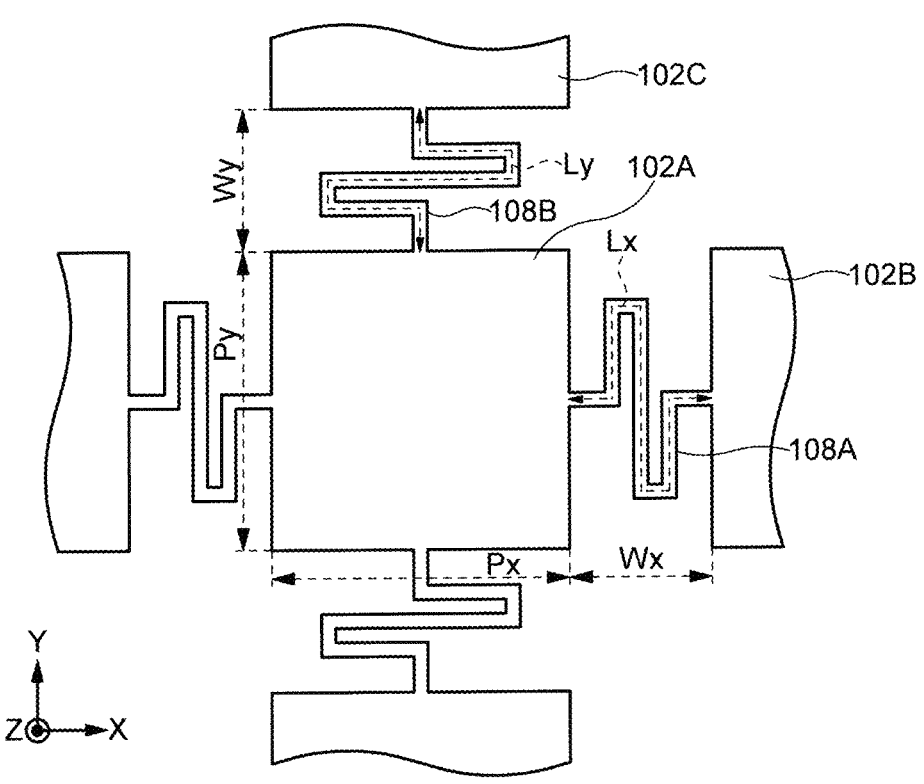
FIG. 5A is an enlarged plan view of a portion of a reflecting device according to an embodiment of the present invention and shows a plurality of common electrodes and a plurality of common wirings.

FIG. 5A shows a shape in which the common wiring 108 having the length Lx is bent into a hook shape between the common electrode 102A and the common electrode 102B in a plan view. In other words, the common wiring 108A which connects the common electrode 102A to the common electrode 102B has a bent shape with a plurality of bending points between one end and the other end in a plan view. This bending shape allows the common wiring 108A to be arranged in a gap Wx narrower than the length Lx. Since the common wiring 108B also has the same shape as the common wiring 108A, the common wiring 108B can be arranged in the gap Wy that is narrower than the length Ly. As long as the Length Lx and the Length Ly are satisfied, there is no limit to the number of bending points that this bending shape has, and it may have more bending points than the example shown in FIG. 5A, such as the patterns of the common wiring 108A and the common wiring 108B shown in FIG. 5B.

Figure 5B:
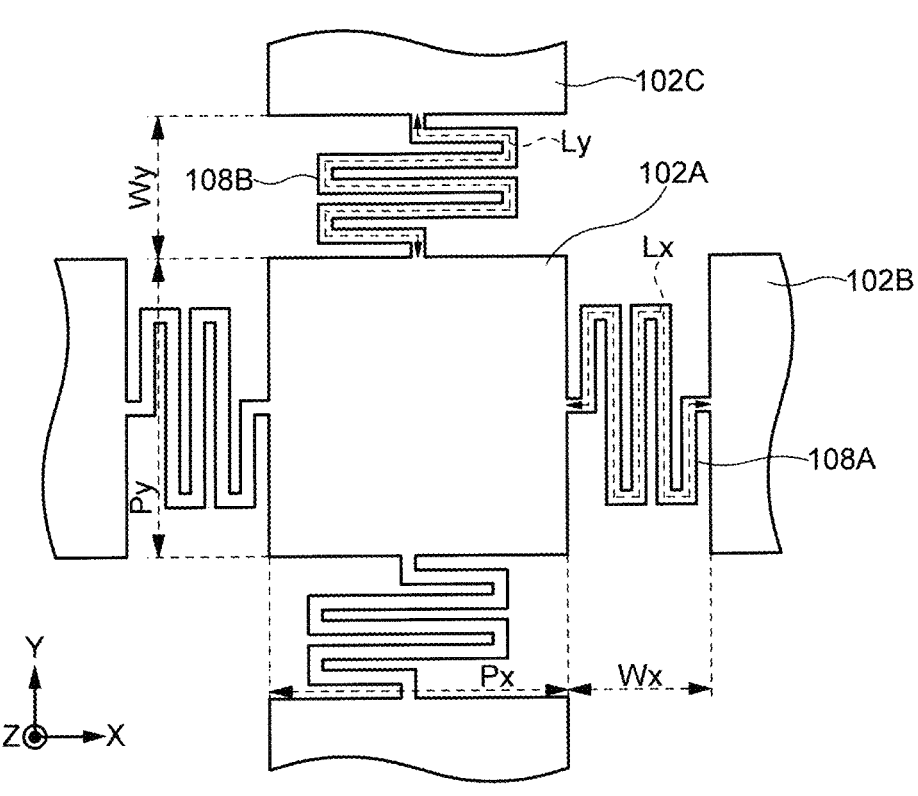
FIG. 5B is an enlarged plan view of a portion of a reflecting device according to an embodiment of the present invention and shows a plurality of common electrodes and a plurality of common wirings.
Figure 5C:
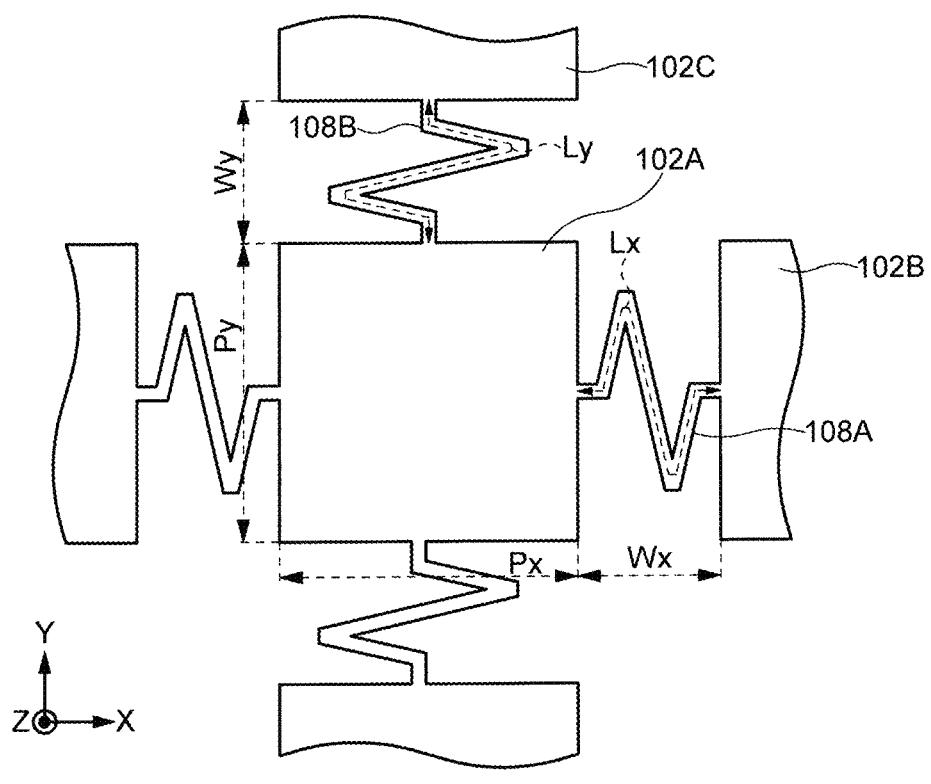
FIG. 5C is an enlarged plan view of a portion of a reflecting device according to an embodiment of the present invention and shows a plurality of common electrodes and a plurality of common wirings.
Figure 5D:
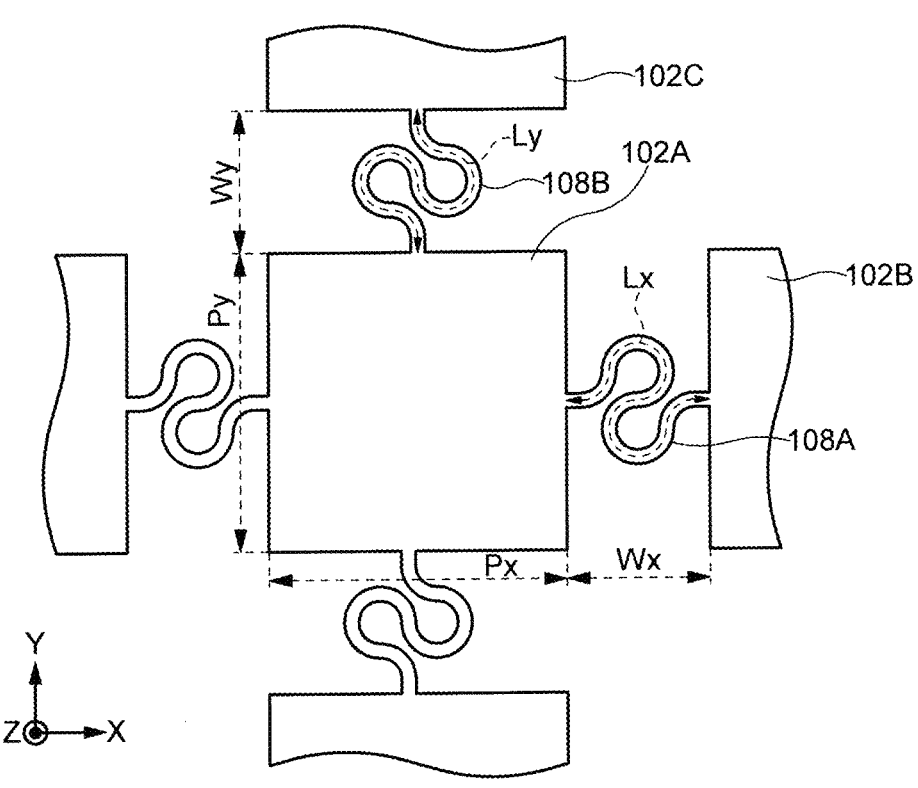
FIG. 5D is an enlarged plan view of a portion of a reflecting device according to an embodiment of the present invention and shows showing a plurality of common electrodes and a plurality of common wirings.

The shapes of the common wirings 108A, 108B are not limited to those shown in FIG. 5A and FIG. 5B. For example, as shown in FIG. 5C, they may have a zigzag pattern with straight lines alternately bending, or they may have a curved bending pattern with a circular arc, as shown in FIG. 5D.

The shape of the common wirings 108A, 108B is preferably to have 180-degree rotational symmetry. The shape of the common wirings 108A, 108B has 180-degree rotational symmetry so that the rotational symmetry of the common electrode 102A is not disturbed.

Furthermore, it is preferable that the pattern of the common wirings 108A, 108B has a length of a straight-line portion of 50% or less of $\lambda_g/2$. In other words, the common wiring 108A, 108B is preferred to include a straight-line portion, and the length of this straight-line portion is less than a quarter of the effective wavelength $\lambda_g$. In this way, it is possible to prevent the common wirings 108A, 108B from acting as patch electrodes, and to prevent unintended reflected waves from being generated.

Figure 6:
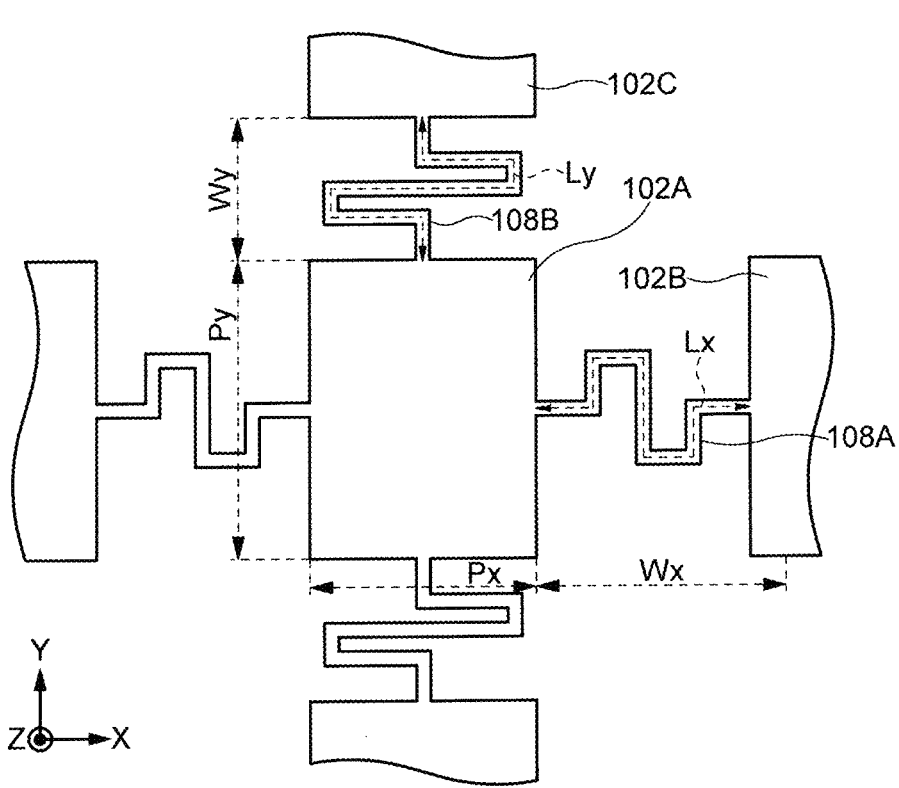
FIG. 6 is an enlarged plan view of a portion of the reflecting device according to an embodiment of the present invention and shows a plurality of rectangular common electrodes and a plurality of common wirings.

FIG. 6 is an enlarged plan view of a portion of the reflecting device according to an embodiment of the present invention, and shows the plurality of common electrodes

102 and the plurality of common wirings 108. The common electrode 102 is rectangular and has long sides along the y-axis direction (Px<Py).

As shown in FIG. 6, the common electrode 102A has an asymmetric shape with respect to the horizontal and vertical polarization of the incoming radio wave. It is preferable that the lengths Lx and Ly of the common wirings 108A, 108B also have different lengths. That is, when the effective wavelengths at which the horizontally polarized wave and the vertically polarized wave propagate through the dielectric layer are $\lambda_{gx}$ and $\lambda_{gy}$, respectively, the length Lx and the length Ly have the lengths $\lambda_{gx}/2$ and $\lambda_{gy}/2$.

1-4. Operation of Unit Cell

Figure 7A:
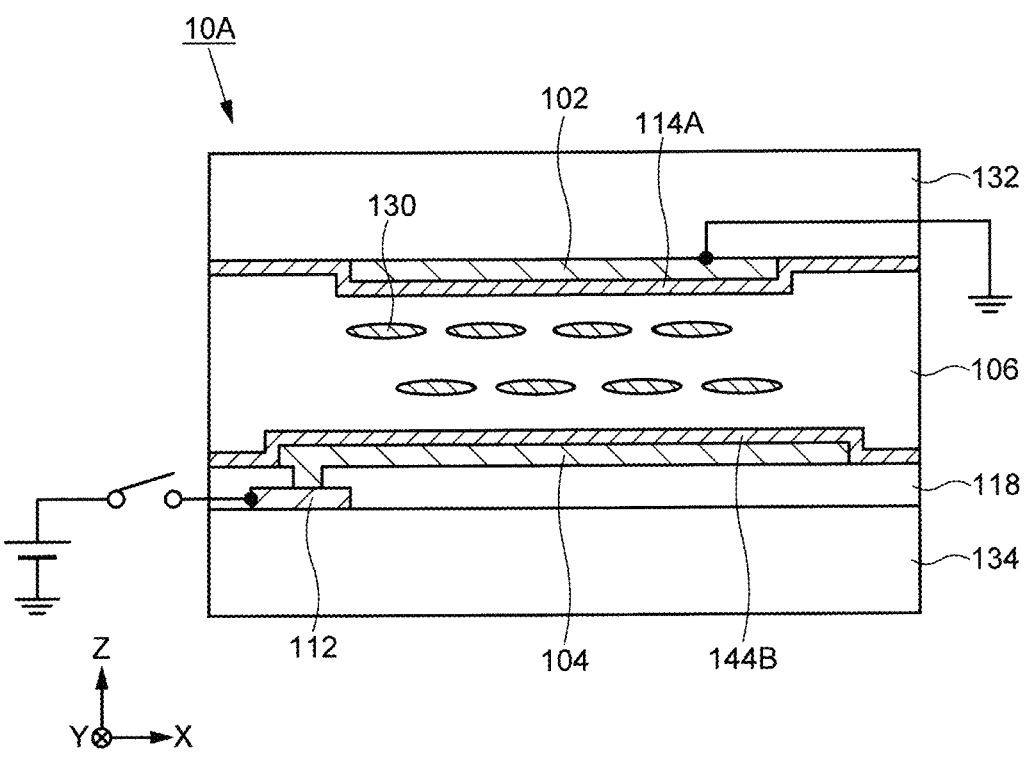
FIG. 7A is a diagram illustrating the operation of a unit cell configuring a reflecting device according to an embodiment of the present invention and shows a state in which a bias voltage is not applied to the liquid crystal layer.
Figure 7B:
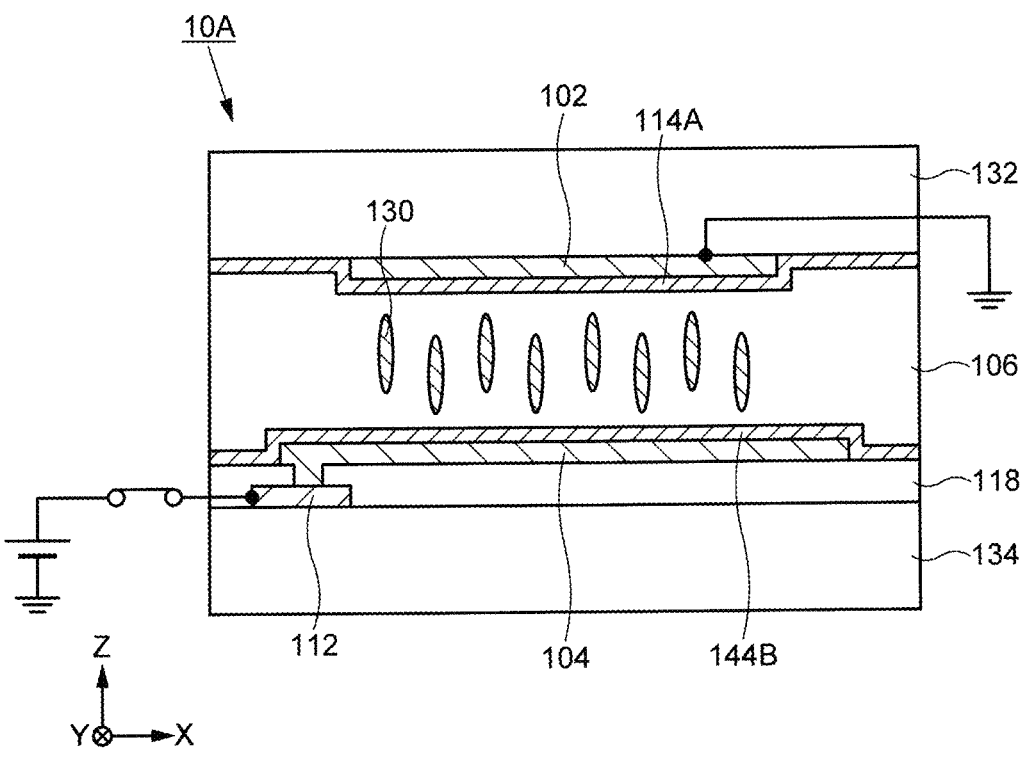
FIG. 7B is a diagram illustrating the operation of a unit cell configuring a reflecting device according to an embodiment of the present invention and shows a state in which a bias voltage is applied to the liquid crystal layer.

FIG. 7A and FIG. 7B show the operation of the unit cell 10A. FIG. 7A and FIG. 7B show the case where the first alignment film 114A and the second alignment film 114B are horizontally aligned films. FIG. 7A shows a state in which a bias voltage is not applied to the bias electrode 104. In other words, FIG. 7B shows a state in which a voltage is not applied to the bias electrode 104 at a level that alters the alignment state of the liquid crystal molecules, that is, a voltage higher than the threshold value. This state is hereinafter referred to as the "first state". FIG. 7A shows that in the first state, the long axis of the liquid crystal molecules 130 is aligned horizontally (initial alignment state) due to the alignment regulating force of the first alignment film 114A and the second alignment film 114B. In other words, the first state is a state in which the long axis direction of the liquid crystal molecules 130 is aligned horizontally with respect to the surfaces of the common electrode 102 and the bias electrode 104.

FIG. 7B shows a state in which a bias voltage is applied to the bias electrode 104 at a voltage level that alters the alignment state of the liquid crystal molecules 130, that is, a bias voltage sufficiently higher than the threshold value. This state is hereinafter referred to as the "second state". The second state is where the long axis direction of the liquid crystal molecules 130 is affected by the electric field generated by the bias voltage and aligns in a direction that is perpendicular to the surfaces of the common electrode 102 and the bias electrode 104. The angle at which the long axis of the liquid crystal molecules 130 aligns can be controlled by the magnitude of the bias signal applied to the bias electrode 104, and can be aligned at an angle intermediate between horizontal and vertical.

When the liquid crystal molecules 130 have positive dielectric anisotropy, the dielectric constant in the direction along the Z-axis is larger in the second state (FIG. 7B) relative to the first state (FIG. 7A). When the liquid crystal molecules 130 have negative dielectric constant anisotropy, the apparent dielectric constant in the direction along the Z-axis is smaller in the second state (FIG. 7B) relative to the first state (FIG. 7A). The liquid crystal layer 106 formed with liquid crystals having dielectric constant anisotropy can be regarded as a variable dielectric layer. It is possible to control the unit cell 10A to delay (or not) the phase of the radio wave reflected at the common electrode 102 by using the dielectric constant anisotropy of the liquid crystal layer 106.

Figure 8:
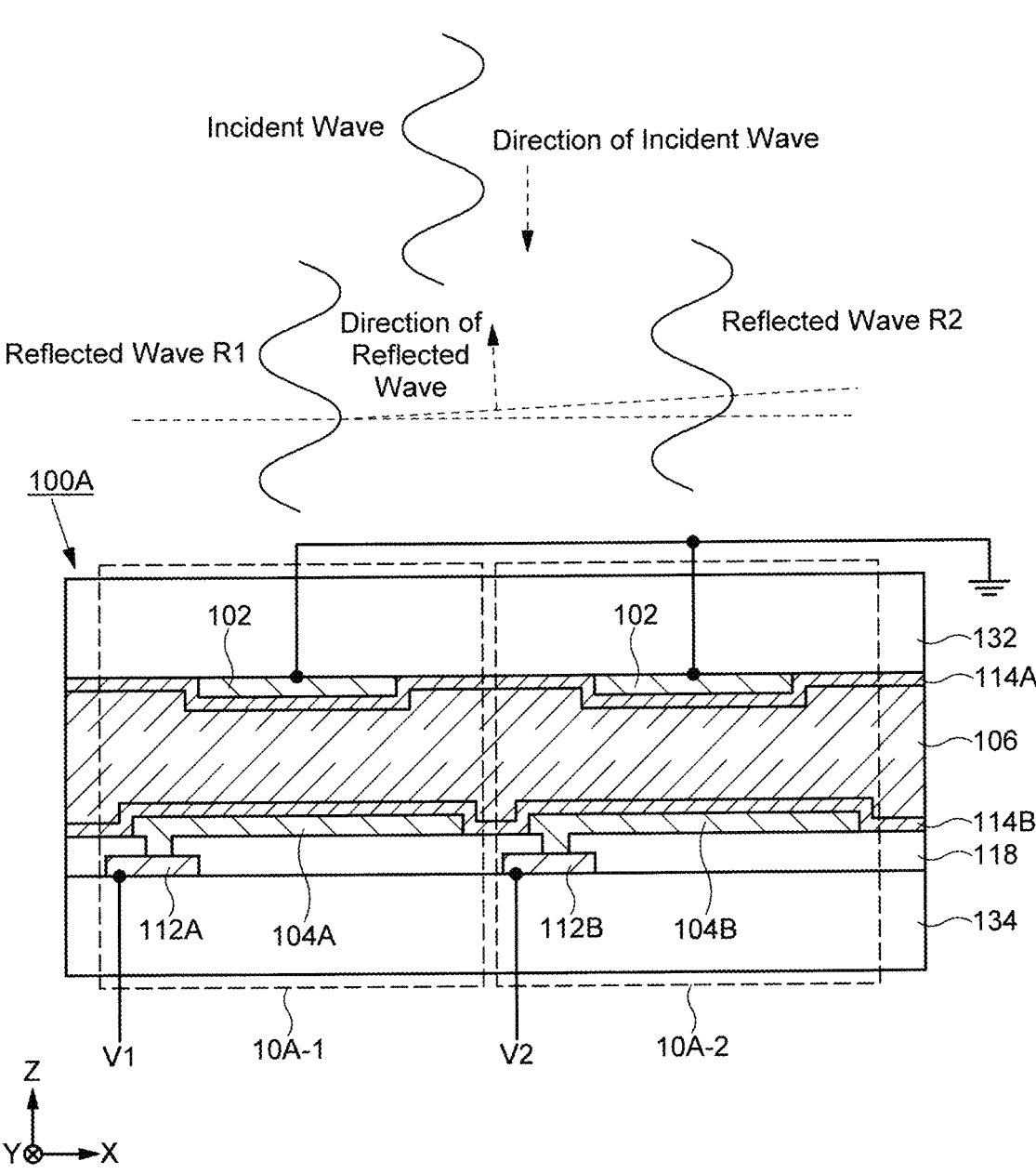
FIG. 8 is a schematic illustration of a change in the direction of travel of the reflected wave by a reflecting device according to an embodiment of the present invention.

FIG. 8 schematically shows a mode in which the traveling direction of the reflected wave is changed by the first unit cell 10A-1 and the second unit cell 10A-2. A bias signal V1 is applied to the bias electrode 104A of the first unit cell 10A-1 from the bias signal line 112A. A bias signal V2 is applied to the bias electrode 104B of the second unit cell 10A-2 from the bias signal line 112B. Voltage levels of the bias signal V1 and bias signal V2 are different (V1≠V2). The common electrode 102 of the first unit cell 10A-1 and the second unit cell 10A-2 are at the same potential, for example, set to a common potential.

FIG. 8 schematically shows that when radio waves are incident on the first unit cell 10A-1 and the second unit cell 10A-2 at the same phase, the phase change of the reflected wave by the second unit cell 10A-2 is larger than that of the first unit cell 10A-1, since different bias signals (V1≠V2) are applied to the first unit cell 10A-1 and the second unit cell 10A-2. As a result, a phase of the reflected wave R1 reflected by the first unit cell 10A-1 and a phase of the reflected wave R2 reflected by the second unit cell 10A-2 are different (FIG. 8 shows that the phase of the reflected wave R2 is more advanced than that of the reflected wave R1), and the apparent direction of the reflected wave changes in an oblique direction.

As shown in FIG. 8, the reflecting device 100A can make the phase of the reflected wave with respect to the incident wave different between the first unit cell 10A-1 and the second unit cell 10A-2. FIG. 8 schematically shows two unit cells, in reality, the direction of the reflected wave can be controlled in any direction without changing the direction of the reflecting device 100A by controlling the unit cells 10A, which are arranged in a matrix, individually. Since the plurality of common electrodes 102 arranged on the reflective surface of the reflecting device 100A are held at a constant potential (for example, ground potential), it is possible to avoid the influence of the electric field generated by the bias signal lines 112A, 112B on the front side of the reflecting device 100A, since the bias electrodes 104A, 104B, which apply bias voltage to the liquid crystal layer 106, and the bias signal lines 112A, 112B are arranged on the back of the common electrodes 102.

Thus, the reflecting device 100A in this embodiment has the common electrode 102 arranged on the incident surface of the radio wave and maintained at a constant potential, so that the electric field is not disturbed by the bias signal line 112 to which the bias voltage is applied, and the direction of the reflected wave can be accurately controlled. Furthermore, it is possible to ensure that the current density distribution generated at the common electrode 102 is not disturbed, and reflection losses can be suppressed, since the common wiring 108 has a length of half the effective wavelength propagating through the dielectric layer of the target radio wave.

Second Embodiment

This embodiment shows an example of a reflecting device whose common electrode and common wiring structure differs from the first embodiment. The following description will focus on the portions that differ from the first embodiment, and duplicated portions will be omitted as appropriate.

Figure 9:
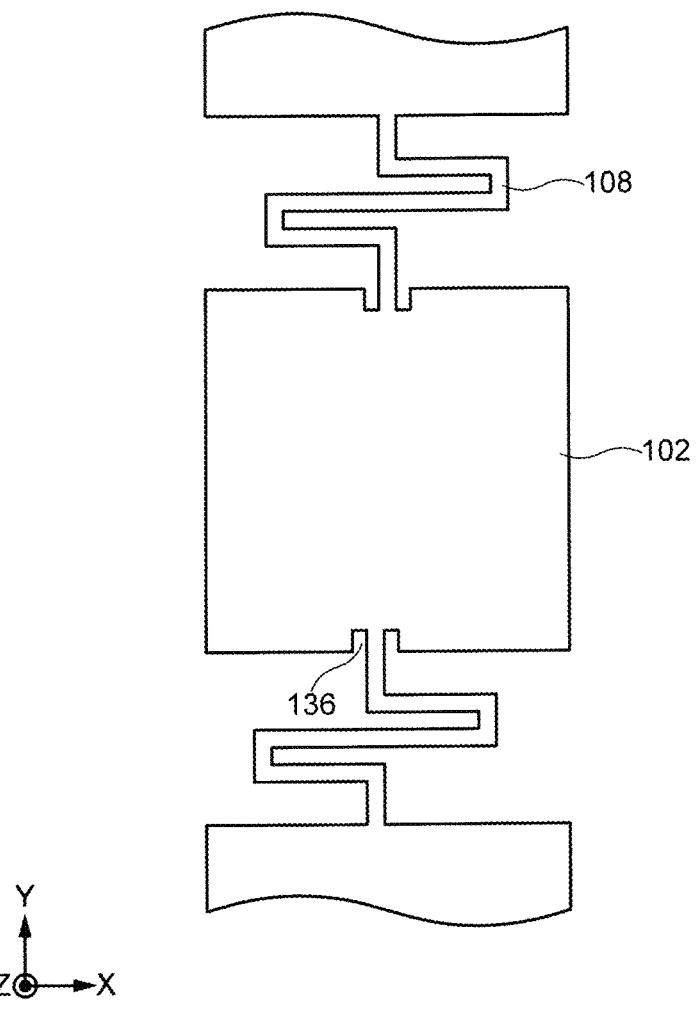
FIG. 9 is an enlarged plan view of a portion of a reflecting device according to a second embodiment and shows a plurality of common electrodes with a plurality of notches and a plurality of common wirings.

FIG. 9 is an enlarged plan view of a portion of the reflecting device of the second embodiment, and shows a plurality of common electrodes with a plurality of notches and a plurality of common wiring. The common electrode 102 has notches 136 (recesses) in a part of its outer shape, and the common wiring 108 is connected to the notches 136. It is possible to match the impedance at the connection point of the common electrode 102 and the common wiring 108, thereby further suppressing reflection loss compared to the structure of the first embodiment.

Third Embodiment

This embodiment shows an example in which the structure of the reflecting device differs from that of the first embodiment. The following description will focus on the portions that differ from the first embodiment, and duplicated portions will be omitted as appropriate.

Figure 10:
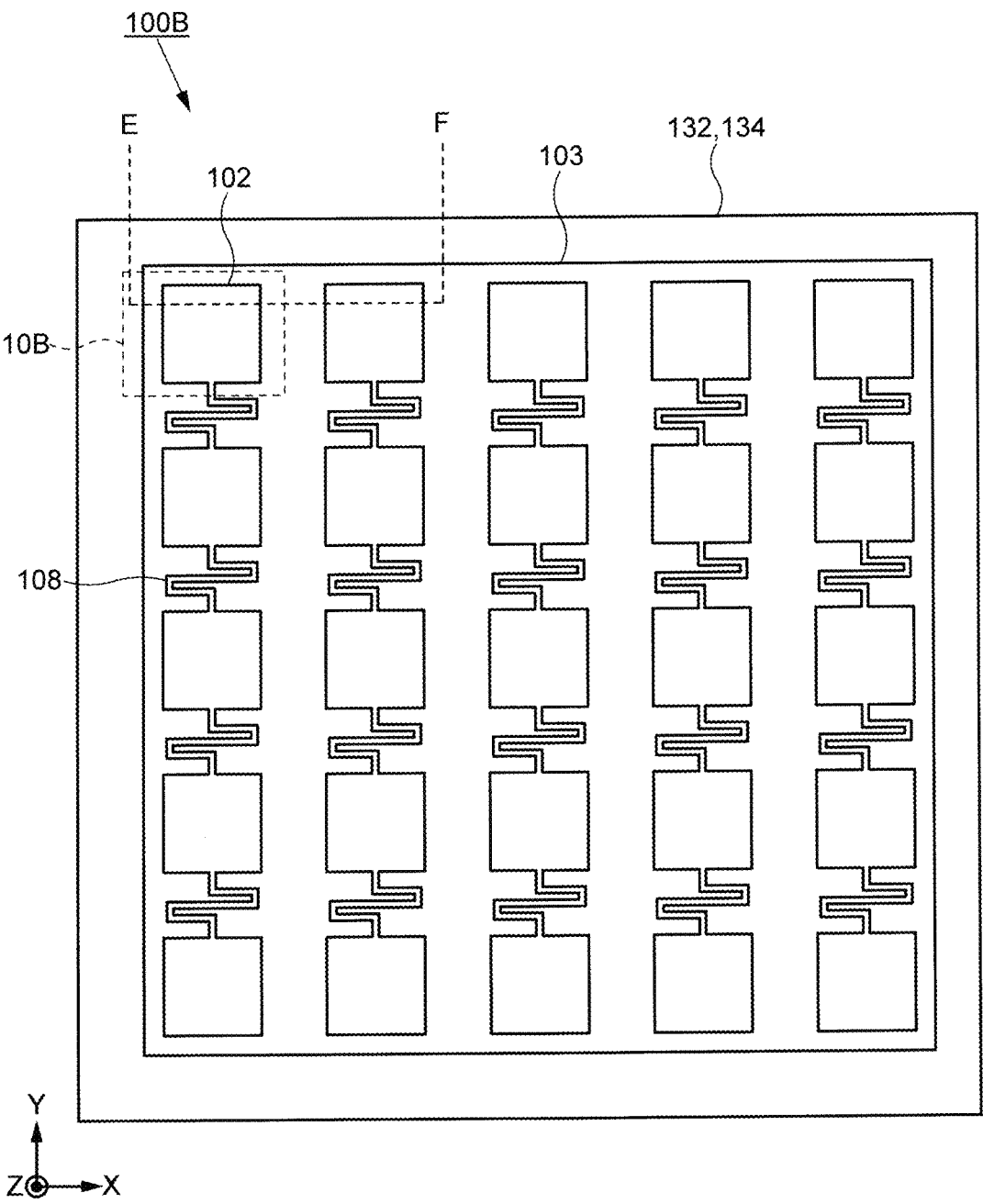
FIG. 10 is a plan view of the reflecting device according to a third embodiment.
Figure 11:
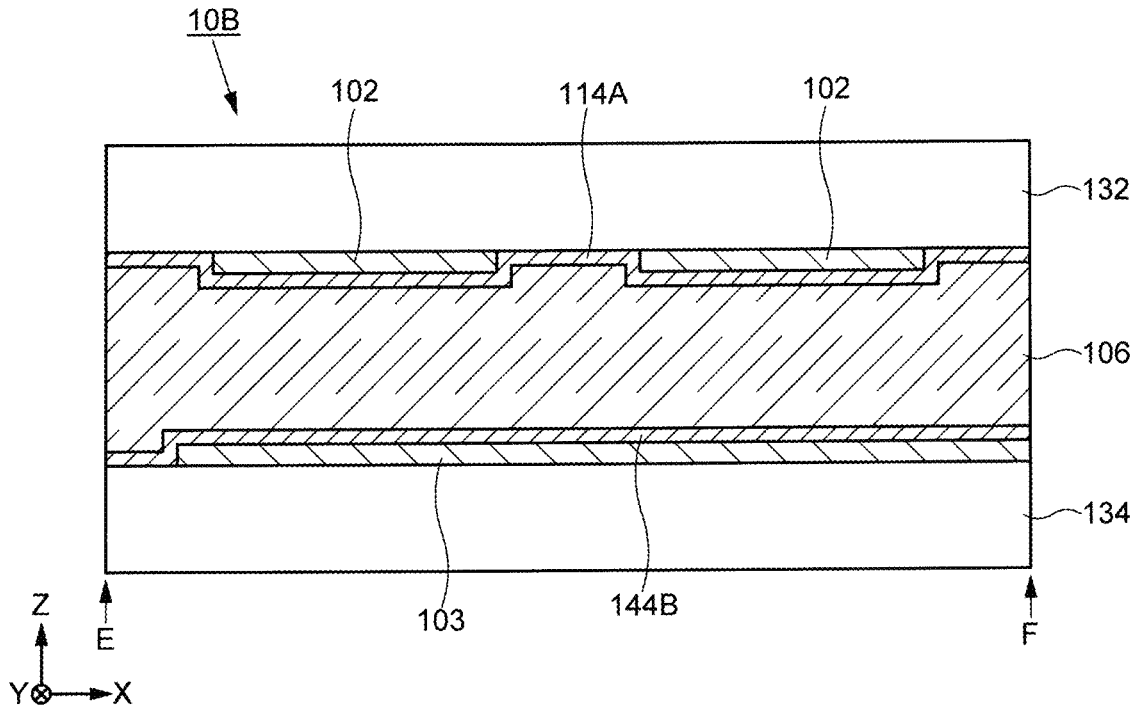
FIG. 11 is a cross-sectional view of the reflecting device shown in FIG. 10 between E and F.

FIG. 10 is a plan view of the reflecting device of the third embodiment. FIG. 11 is a cross-sectional view of the reflecting device shown in FIG. 10 between E and F. The following description will refer to both FIG. 10 and FIG. 11 as appropriate.

A reflecting device 100B includes at least one common electrode 102, at least one bias electrode 104, and a liquid crystal layer 106 arranged between these electrodes.

The plurality of common electrodes 102 are connected to each other by common wiring 108 only along the X-axis or Y-axis direction. In this embodiment, an example is shown in which the plurality of common electrodes 102 are connected along the Y-axis direction by the common wiring 108. In contrast, the bias electrodes 104 are arranged extending in the X-axis and Y-axis directions.

The common electrode 102 is arranged on the first substrate 132 and the bias electrode 104 is arranged on the second substrate 134. The common electrode 102 is arranged on the incident surface, and the bias electrode 104 is arranged across the liquid crystal layer 106 behind the common electrode 102.

The reflecting device 100B has a structure in which the common electrode 102, the liquid crystal layer 106, and the bias electrode 104 are arranged so that they overlap in a plan view. The reflecting device 100A is arranged so that the surface on which the common electrode 102 is arranged on the first substrate 132 and the surface on which the bias electrode 104 is arranged on the second substrate 134 are arranged counter to each other, and the liquid crystal layer 106 is arranged between them. The reflecting device 100B has a basic unit of a stacked structure of a set of the common electrode 102, the liquid crystal layer 106, and the bias electrode 104 (which may also include the first substrate 132 and the second substrate 134). In the following description, this basic unit is referred to as the unit cell 10B.

The alignment state of the liquid crystal molecules in the liquid crystal layer 106 is controlled by the common electrode 102. It is possible to align the alignment state of the liquid crystal molecules in the liquid crystal layer 106 for each row of the unit cell 10B, since the common voltage applied to the common electrode 102 can be controlled for each row of the unit cell 10B connected along the Y-axis direction. The common electrode 102 is connected by a common wiring 108, and the common wiring 108 is connected to a power supply circuit (not shown). The bias electrode 104 is at the same potential, e.g., set to a common potential.

Although not illustrated in FIG. 10 and FIG. 11, the first substrate 132 and the second substrate 134 may be arranged with driver circuits that apply voltage to the common electrode 102. Input terminals may be arranged to input signals and drive power to drive these driver circuits.

Since the reflecting device 100B shown in this embodiment has a length that is half the effective wavelength of the radio wave that the common wiring 108 targets propagating through the liquid crystal layer, it is possible to prevent the current density distribution generated in the common electrode 102 from being disturbed, thereby suppressing reflection loss.

The various configurations of the reflecting devices illustrated as embodiments of the present invention may be combined as appropriate as long as they do not contradict each other. Based on the reflecting devices disclosed in this specification and the drawings, any addition, deletion, or design change of configuration elements, or any addition, omission, or change of conditions of a process by a person skilled in the art is also included in the scope of the present invention, as long as it has the gist of the invention.

Other advantageous effects different from the advantageous effects brought about by the mode of embodiment disclosed herein, which are obvious from the description herein or which can be easily foreseen by those skilled in the art, are naturally considered to be brought about by the present invention.

What is claimed is:

1. A reflecting device comprising:
common electrodes arranged in a matrix in a first direction and a second direction intersecting the first direction, one of the common electrodes and another one of the common electrodes being apart from each other;
bias electrodes arranged overlapping the common electrodes in a planar view;
a liquid crystal layer between the common electrodes and the bias electrodes; and
common wirings connecting adjacent common electrodes among the common electrodes,
wherein each of the common wirings has a length of half an effective wavelength $\lambda_g$ with respect to a radio wave of a specific wavelength $\lambda$ when a radio wave of a specific wavelength $\lambda$ propagates through the liquid crystal layer, and
a distance between the one of the common electrodes and the another one of the common electrodes is narrower than a length of the one of the common electrodes in the first direction and a length of the one of the common electrodes in the second direction intersecting the first direction.

2. The reflecting device according to claim 1, wherein the liquid crystal layer has a positive dielectric constant anisotropy,
when an average dielectric constant of the liquid crystal layer is $\varepsilon$, an effective wavelength $\lambda_g$ is assigned by equation (1), $$\lambda_g = \lambda/(\varepsilon_s)^{1/2} \tag{1}$$

a length L of the common electrode satisfy equation (2)

$$\lambda_g \times 0.9 \leqq L \leqq \lambda_g \times 1.1. \tag{2}$$

3. The reflecting device according to claim 1, wherein each of the common wirings is connected to a point that includes a center point of one side of each of the common electrodes.

4. The reflecting device according to claim 1, wherein a length of each of the common wirings is longer than the distance.

5. The reflecting device according to claim 1, wherein the common wirings have a bent pattern in a plan view.

6. The reflecting device according to claim 5, wherein the pattern has 180-degree rotational symmetry.

7. The reflecting device according to claim 5, wherein the pattern includes a linear portion, and a length of the linear portion is less than a quarter of the effective wavelength $\lambda_g$.

8. The reflecting device according to claim 1, wherein each of the common electrodes is arranged with notches adjacent to a connection part of each of the common wirings.

9. The reflecting device according to claim 1, wherein the common electrodes arranged in a matrix are connected along the first direction by the common wirings and are not connected along the second direction intersecting the first direction.

10. The reflecting device according to claim 1, further comprising bias signal lines for applying a bias voltage to the bias electrodes and switching elements connecting the bias electrodes and the bias signal lines.

\* \* \* \* \*

14